(12) United States Patent
Speiser et al.

(10) Patent No.: US 9,277,390 B2
(45) Date of Patent: *Mar. 1, 2016

(54) MOBILE PAYMENT AND IDENTITY VERIFICATION SYSTEM

(71) Applicant: Clover Network, Inc., Mountain View, CA (US)

(72) Inventors: Leonard R. Speiser, Los Altos, CA (US); John D. Beatty, Redwood City, CA (US)

(73) Assignee: First Data Corporation, Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/286,421

(22) Filed: May 23, 2014

(65) Prior Publication Data

US 2014/0273996 A1  Sep. 18, 2014

Related U.S. Application Data

(63) Continuation of application No. 13/666,891, filed on Nov. 1, 2012, now Pat. No. 8,774,781.

(60) Provisional application No. 61/554,488, filed on Nov. 1, 2011.

(51) Int. Cl.
*H04W 12/06* (2009.01)
*H04W 4/24* (2009.01)
(Continued)

(52) U.S. Cl.
CPC ............. *H04W 4/24* (2013.01); *G06Q 20/3224* (2013.01); *G06Q 20/3274* (2013.01); *G06Q 20/4012* (2013.01); *H04L 29/06* (2013.01); *H04M 1/72522* (2013.01); *H04W 4/206* (2013.01)

(58) Field of Classification Search
CPC ..................................................... H04W 12/06
USPC ................ 455/410, 411, 414.1, 414.2, 414.3; 705/35, 39, 40, 42, 44
See application file for complete search history.

(56) References Cited

U.S. PATENT DOCUMENTS 7,374,079 B2  5/2008 Nam et al.
7,658,327 B2 *  2/2010 Tuchman et al. ............. 235/381
(Continued)

OTHER PUBLICATIONS

Non-final Office Action for U.S. Appl. No. 13/666,891, mailed Aug. 1, 2013.

(Continued)

*Primary Examiner* — Christopher M Brandt
(74) *Attorney, Agent, or Firm* — Sutherland Asbill & Brennan LLP

(57) ABSTRACT

Techniques are disclosed relating to facilitating transactions via mobile devices. In one embodiment, an account that is linked to a mobile telephone number of a mobile device is established at a computer system. In such an embodiment, the account permits a user to make and receive payments, and is not accessible without using the mobile device. In some embodiments, the account is established without setting up a username and password. In one embodiment, a request is sent from a payment application of the mobile device to the computer system. In some embodiments, the payment application is made active on the mobile device in response to a user input within a different application running on the mobile device. After the payment application is active, a purchase is confirmed within the payment application such that the request is sent responsive to the confirming and without authenticating the user within the payment application.

12 Claims, 16 Drawing Sheets

(51) Int. Cl.
  *H04L 29/06*  (2006.01)
  *G06Q 20/32*  (2012.01)
  *G06Q 20/40*  (2012.01)
  *H04M 1/725*  (2006.01)
  *H04W 4/20*   (2009.01)

(56) References Cited

U.S. PATENT DOCUMENTS

| | | | |
|---|---|---|---|
| 7,865,448 B2* | 1/2011 | Pizarro | 705/65 |
| 7,885,870 B2 | 2/2011 | Nam et al. | |
| 8,152,055 B2 | 4/2012 | Miller et al. | |
| 8,774,781 B1 | 7/2014 | Speiser et al. | |
| 2002/0107007 A1* | 8/2002 | Gerson | 455/414 |
| 2004/0267664 A1 | 12/2004 | Nam et al. | |
| 2004/0267665 A1 | 12/2004 | Nam et al. | |
| 2007/0138268 A1* | 6/2007 | Tuchman | 235/383 |
| 2007/0265984 A1 | 11/2007 | Santhana | |
| 2008/0146194 A1* | 6/2008 | Yang et al. | 455/411 |
| 2009/0098854 A1 | 4/2009 | Park et al. | |
| 2009/0164371 A1 | 6/2009 | Arroyo et al. | |
| 2009/0234772 A1 | 9/2009 | Van Rensburg et al. | |
| 2009/0259588 A1* | 10/2009 | Lindsay | 705/40 |
| 2009/0281904 A1* | 11/2009 | Pharris | 705/17 |
| 2010/0145835 A1* | 6/2010 | Davis et al. | 705/30 |
| 2010/0210287 A1* | 8/2010 | De Vries et al. | 455/456.3 |
| 2010/0279652 A1* | 11/2010 | Sharp et al. | 455/410 |
| 2011/0060684 A1 | 3/2011 | Jucht et al. | |
| 2011/0066550 A1* | 3/2011 | Shank et al. | 705/43 |
| 2011/0238574 A1 | 9/2011 | Miller et al. | |
| 2011/0265148 A1* | 10/2011 | Tam et al. | 726/4 |
| 2012/0025950 A1* | 2/2012 | Von Tippelskirch et al. | 340/5.74 |
| 2012/0054046 A1* | 3/2012 | Albisu | 705/16 |
| 2012/0072340 A1* | 3/2012 | Amron | 705/39 |
| 2012/0136721 A1* | 5/2012 | Ullah | 705/14.53 |
| 2012/0136732 A1* | 5/2012 | McMillen et al. | 705/16 |
| 2012/0136786 A1* | 5/2012 | Romagnoli et al. | 705/44 |
| 2012/0203697 A1* | 8/2012 | Morgan et al. | 705/44 |
| 2012/0223133 A1 | 9/2012 | Miller et al. | |
| 2012/0240203 A1 | 9/2012 | Kling | |
| 2013/0046692 A1* | 2/2013 | Grigg et al. | 705/44 |

OTHER PUBLICATIONS

Non-final Office Action response for U.S. Appl. No. 13/666,891, mailed Nov. 1, 2013.
Final Office Action for U.S. Appl. No. 13/666,891, mailed Dec. 11, 2013.
Final Office Action response for U.S. Appl. No. 13/666,891, mailed Feb. 4, 2014.
Notice of Allowance for U.S. Appl. No. 13/666,891, mailed Feb. 27, 2014.

* cited by examiner

Mobile Payment Application 100

Mobile Number 110

Selection Options 200

Payment Confirmation 900

*Transaction History 1100*

*FIG. 11*

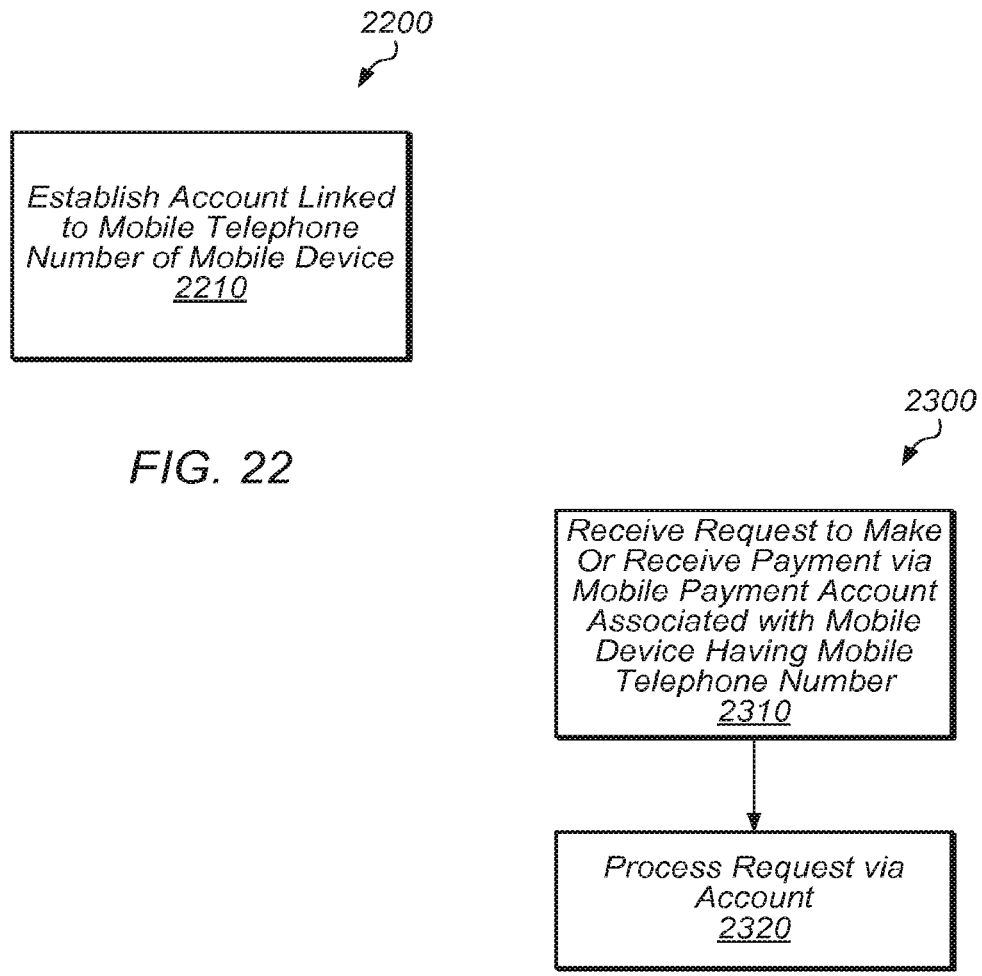

MOBILE PAYMENT AND IDENTITY VERIFICATION SYSTEM

CROSS-REFERENCE TO RELATED APPLICATIONS

This application is a continuation application of U.S. application Ser. No. 13/666,891, filed Nov. 1, 2012, now issued as U.S. Pat. No. 8,774,781, which claims the benefit of U.S. Provisional Application No. 61/554,488, filed on Nov. 1, 2011, the contents of both applications are incorporated by reference.

BACKGROUND

1. Technical Field

This disclosure relates generally to transaction systems, and, more specifically, to facilitating transactions via mobile devices.

2. Description of the Related Art

Various mobile payment applications (i.e., programs that run on a mobile device) currently exist that enable a user to transfer funds to another person. Some of these applications are offered by financial institutions and payment services. These applications may allow a user to transfer funds, view an account balance, find a location of a nearby ATM, pay bills, etc. Some applications allow a user to make deposits by taking pictures of checks. In many instances, however, the user interfaces associated with these mobile payment applications are subpar, and thus do not result in the best possible experience for the user.

SUMMARY

The present disclosure describes embodiments in which an improved mobile payment application executing on a mobile device allows a user to make or receive a payment via a mobile payment service. In certain embodiments, a user's account with the mobile payment service may be linked to the mobile device's mobile telephone number. In certain embodiments, a user's account is not accessible without using the mobile device in some manner to access the account. In such embodiments, the mobile payment account cannot be accessed, for example, by supplying a username and password to a website, without use of the mobile device. In some embodiments, a user's mobile payment account may not have an associated username and password, and may only be accessed using the mobile device (e.g., via the mobile payment application executing on the mobile device). In these embodiments, the mobile payment service may not use email to communicate with the user regarding the account. In other embodiments, the account may have an associated username and password, which may be used in conjunction with the user's mobile device to access the user's account via a website interface.

In some embodiments, the mobile payment application can be used in conjunction with other applications to facilitate a transaction. For example, a user may indicate a selection via a user interface in a third-party application (e.g., indicating a desire to initiate a purchase via the mobile payment application). This selection may, in some embodiments, cause the mobile payment application to become active (i.e., the current application that the user is interacting with). The mobile payment application may then initiate the transaction (for example, after allowing the user to confirm the transaction) without requiring the user to reauthorize himself or herself. In this manner, the user can have a more elegant mobile payment experience.

BRIEF DESCRIPTION OF THE DRAWINGS

FIG. 11 is a screenshot illustrating one embodiment of an interface in which a user is presented with a transaction history.

FIG. 22 is a flow diagram illustrating one embodiment of a method performed by a computer system associated with a mobile payment service.

FIG. 23 is a flow diagram illustrating one embodiment of another method performed by a computer system associated with a mobile payment service.

FIG. 24 is a flow diagram illustrating one embodiment of a method performed by a mobile device executing the mobile payment application.

The disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Mobile Application (FIGS. 1-4)

FIGS. 1-4 depict exemplary screenshots of a registration process for a mobile application 100 (named "Clover" in the figures). In one embodiment, the mobile application may facilitate making and receiving payments using a mobile device (e.g., smartphone) that has an associated mobile number 110. The mobile application is configured to communicate with a computer system that is configured to register the user by establishing an account. In one embodiment, the computer system's authentication system locks an account to a particular phone number, such that the system maintains only one account per mobile number. The mobile application may permit "reclaiming" or overwriting a previous account (e.g., via selection options 200 in FIG. 2) if there is already an account associated with a particular number. In one embodiment, the mobile application may utilize a combination of a mobile device's mobile number, SSL, and various on-device security settings to verify a mobile number over a network.

Figure 1:
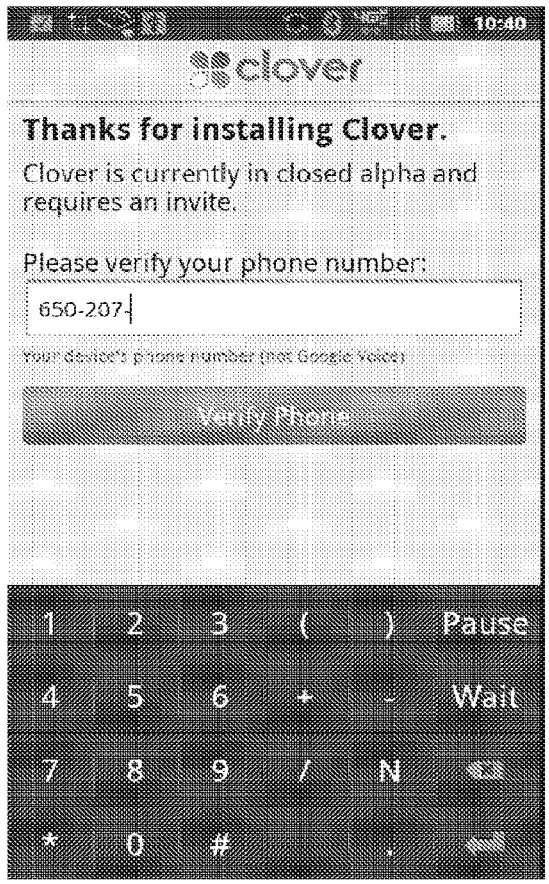
FIG. 1 is a screenshot illustrating one embodiment of an interface for a mobile payment application in which a user may verify a phone number as part of a registration process.
Figure 2:
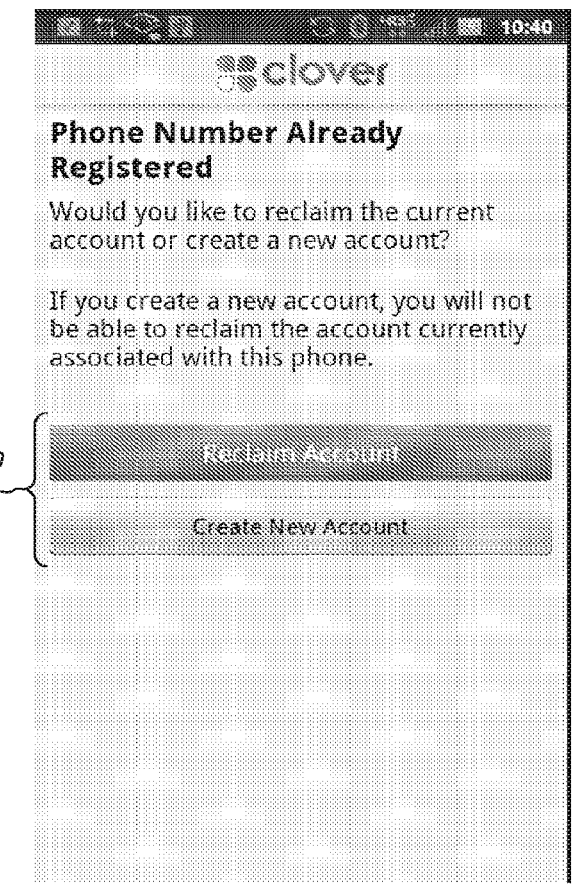
FIG. 2 is a screenshot illustrating one embodiment of an interface in which a user may reclaim an existing account or create a new account as part of the registration process.
Figure 3:
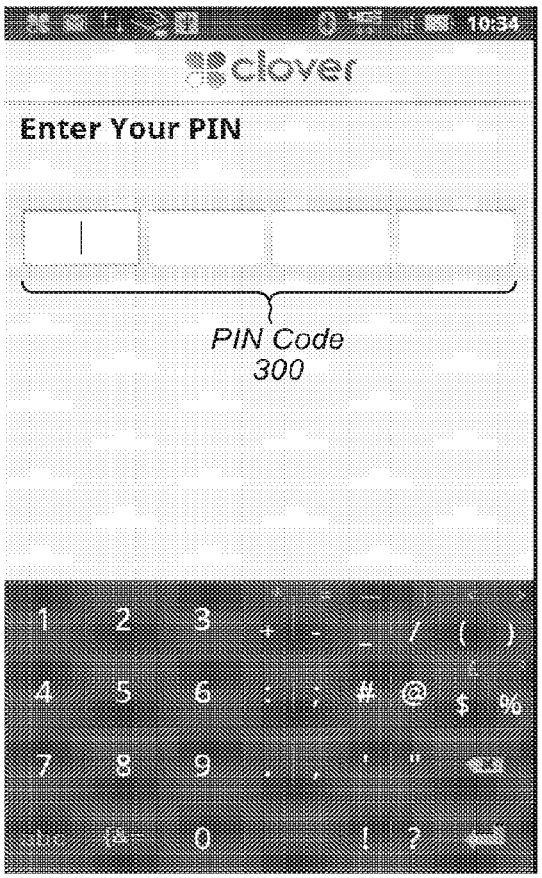
FIG. 3 is a screenshot illustrating one embodiment of an interface in which a user may enter a PIN code as part of the registration process.

FIG. 3 depicts the use of a personal identification (PIN) code 300. This may be established during the registration process in one embodiment. A PIN may be used in some circumstances to verify a mobile payment or other transaction (e.g., a user can set a parameter that all transactions over a specified amount require entry of a PIN on the device, etc.).

In various embodiments, the account is established without setting up a username and password that would permit the user to access his or her account without the use of the mobile device. Thus, in these embodiments, there is no website that the user could log onto using a username/password combination. In the same vein, the computer system may not use email to communicate with the user (e.g., regarding the account), since such communications are susceptible to phishing. As described below, however, in some embodiments, access to a user's account via a website may be possible in conjunction with the mobile device. Thus, in such embodiments, the user's account is not accessible without using the mobile device. Account recovery techniques are described below for instances in which a user loses his or her mobile device or PIN.

Figure 4:
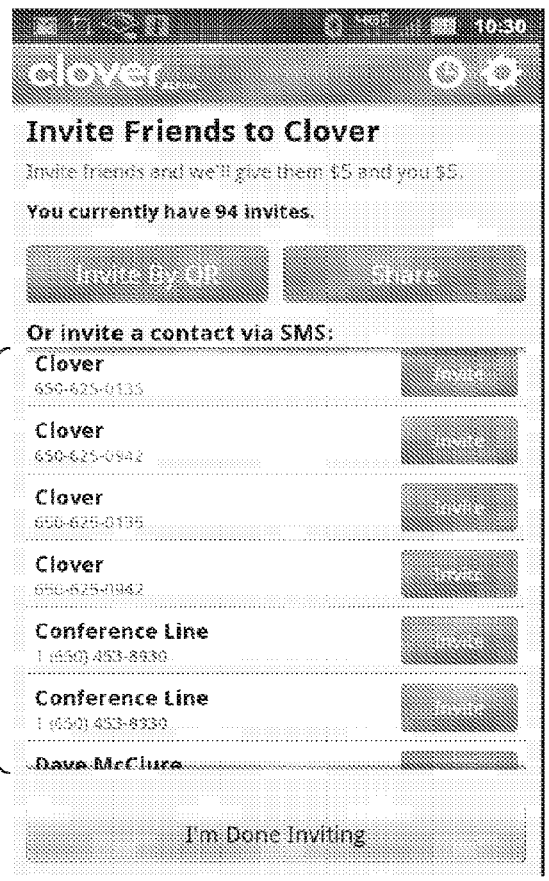
FIG. 4 is a screenshot illustrating one embodiment of an interface in which a user may invite additional users to the payment system as part of the registration process.

FIG. 4 depicts a screenshot of a screen for facilitating a user inviting contacts to also establish accounts with the mobile payment service. This may be done in some embodiments by selecting from a user's existing contacts 400 (on the mobile device or a third-party service such as FACEBOOK, LINKEDIN, etc.), or by the use of a quick response (QR) code, a type of two-dimensional barcode known in the art.

Determination of Fraud Risks

In one embodiment, a computer system associated with a mobile payment service may attach additional data to a user account that may enhance or limit the user's use of the service. Generally speaking, such additional data may be used to assess fraud risk of the user. In some instances, this additional data may originate from information indicative of social relationships (e.g., FACEBOOK friends). For example, credit information for those individuals listed as the user's social contacts may be used to decrease (or increase) the amount of money the user may transact in using the system. Similarly, GPS or other location data may also be used to assess fraud risk, such as when the location data indicates the mobile device is outside the United States or some other specified geographic area (which may be the case if the mobile device is stolen.)

Making and Receiving Payments via Mobile Interface (FIGS. 5-11)

Figure 5:
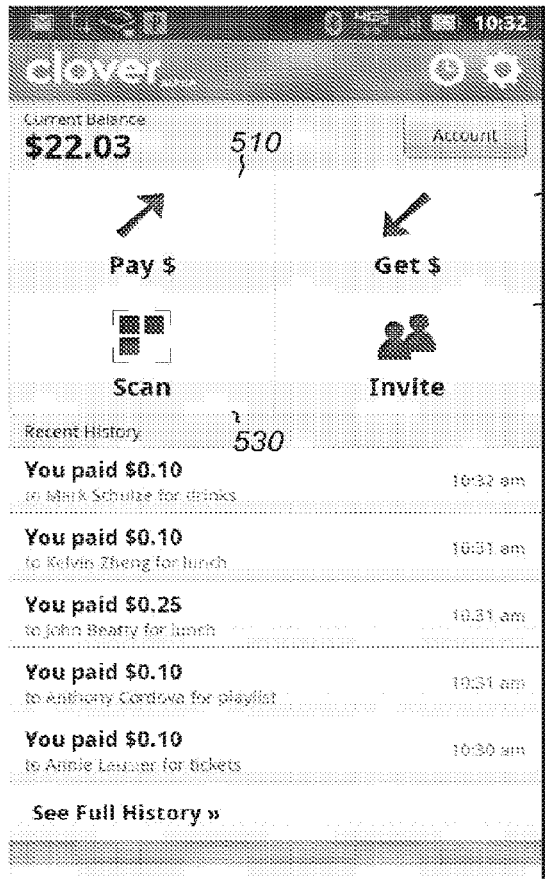
FIG. 5 is a screenshot illustrating one embodiment of an interface in which a user may access various functionality of the mobile application.

FIG. 5 indicates one example of a mobile payment application user interface. In addition to account settings, the interface includes a payment icon 510 to make a payment, request icon 520 to request a payment, scan icon 530 to scan a barcode (e.g., QR code), and invite icon 540 to invite other users to join the system. The exemplary interface also includes a list of recent transactions 550.

Figure 6:
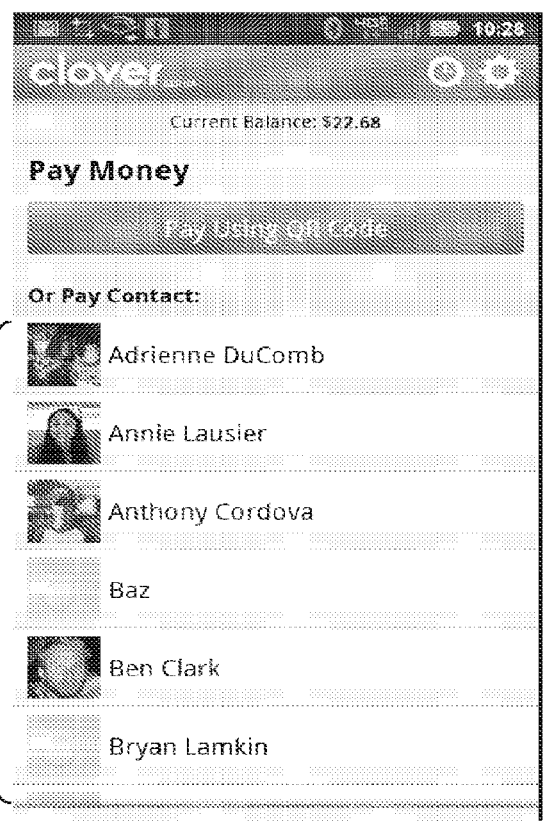
FIG. 6 is a screenshot illustrating one embodiment of an interface in which a user may initiate payment to another user.
Figure 7:
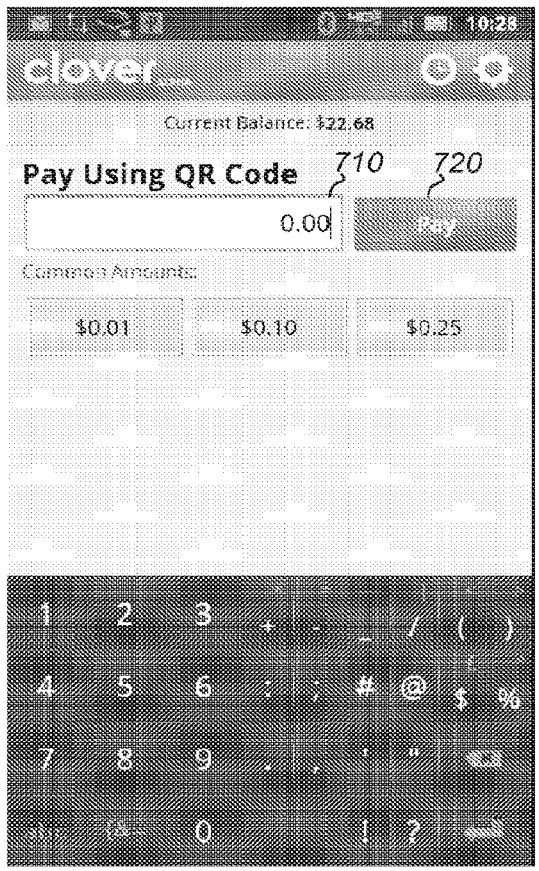
FIG. 7 is a screenshot illustrating one embodiment of an interface in which a user may specify a payment amount.
Figure 8:
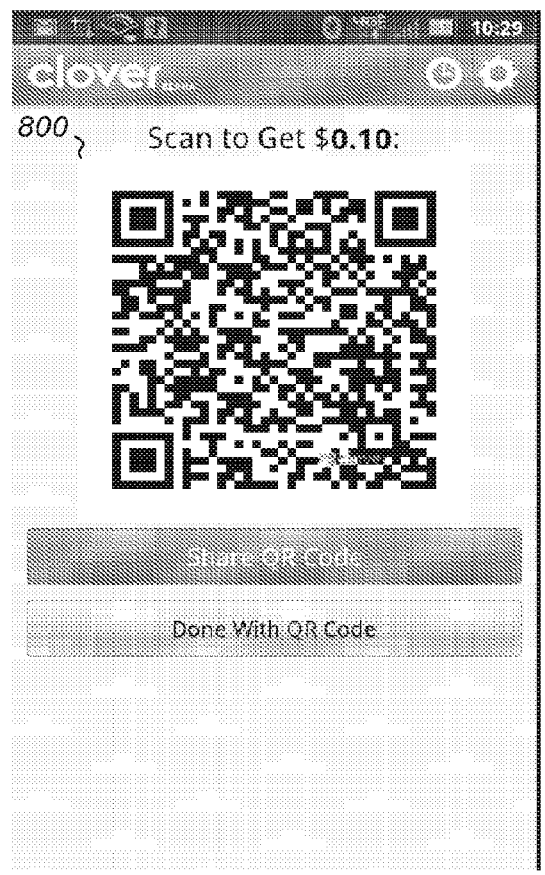
FIG. 8 is a screenshot illustrating one embodiment of an interface in which a user is presented with a barcode usable to facilitate a payment.
Figure 9:
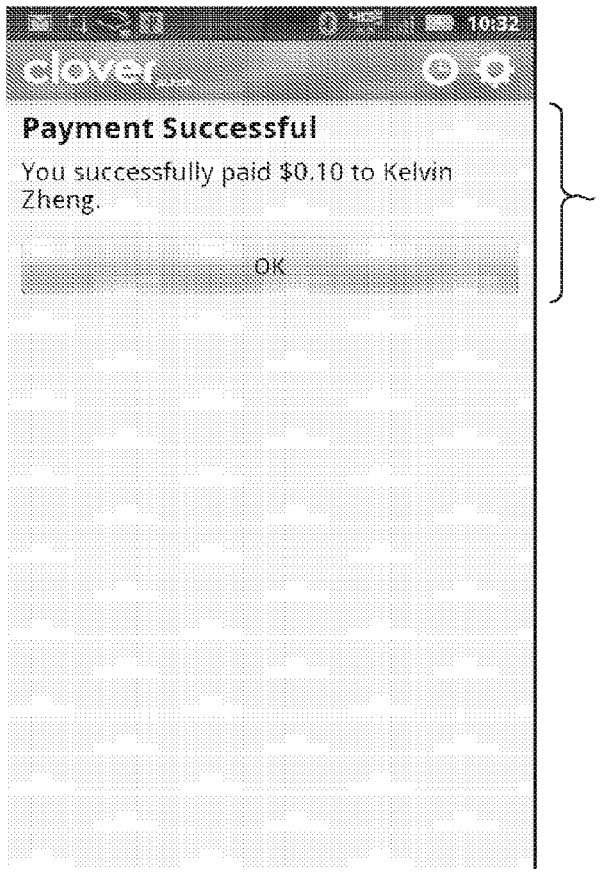
FIG. 9 is a screenshot illustrating one embodiment of an interface in which a user is presented with a confirmation of payment.

In one embodiment, a payment can be made by selecting one of the user contacts 600 (FIG. 6). This involves linking account identifiers with customer data including phone number, name, social network IDs, and emails. This information can be added manually or by importing this data from the mobile device's address book or customer's social network databases. Alternately, a payment can be made by requesting the system to generate a barcode (e.g., by entering an amount 710 and selecting a pay button 720 in FIG. 7) that enables another customer to receive money via the mobile payment system. All instructions for completing the transaction are embedded in the code. FIG. 8 depicts receipt of the barcode 800 by the payee (e.g., via email, text message, Tweet, other electronic message, or hardcopy). In one embodiment, the mobile payment application includes scanning functionality that is able to scan the barcode (e.g., by using the mobile device's camera) and execute the embedded instructions, resulting in having the payment specified by the barcode credited to the user's account. FIG. 9 shows an exemplary payment confirmation 900 that may be displayed upon a payment being successfully sent by a payee.

Figure 10:
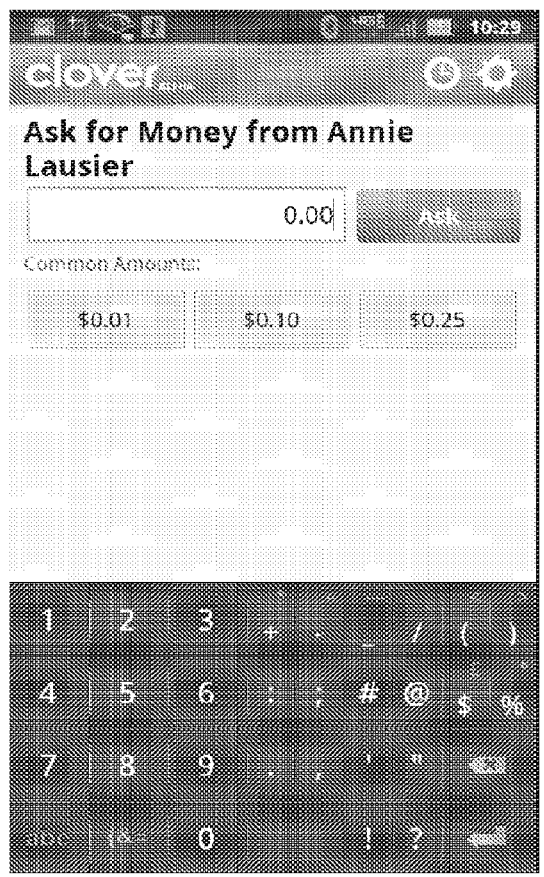
FIG. 10 is a screenshot illustrating one embodiment of an interface in which a user may specify a payment amount to be received from another user.

In some embodiments, a request for money can be made in a similar manner in that the user may select a user contact or generate a barcode. The other customer may then approve the payment request. The paying customer may also request additional information to fulfill the payment, for instance by asking for a shipping address or contact details as part of the order. FIG. 10 shows the use of the mobile payment application to request money from a contact.

Figure 11:
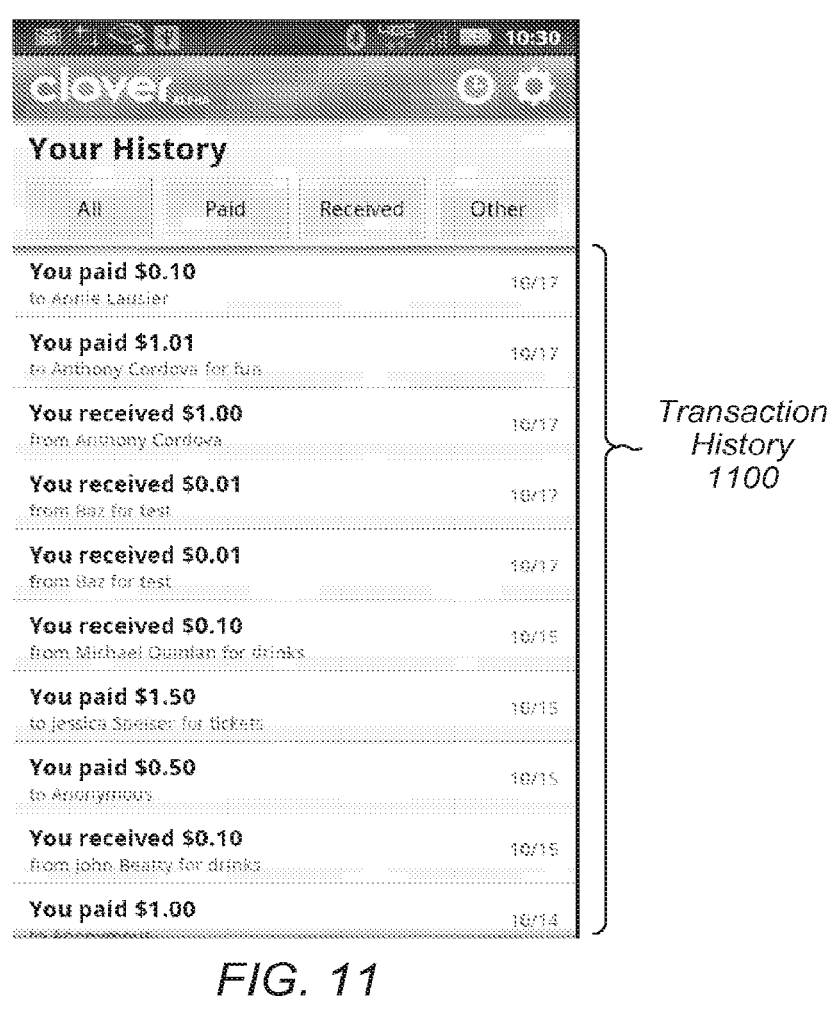

FIG. 11 shows the use of the mobile payment application to display a user's transaction history 1100.

Figure 12:
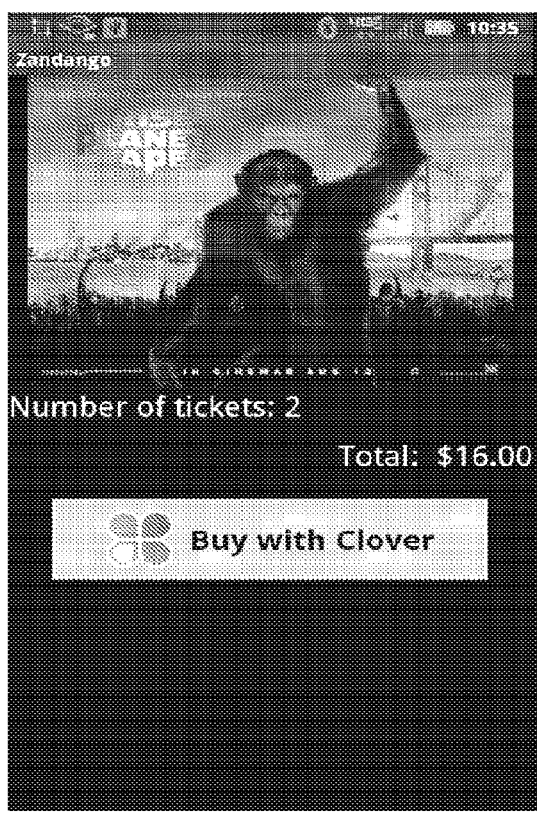
FIG. 12 is a screenshot illustrating one embodiment of an interface for a third-party application that has integrated support for the mobile payment application.
Figure 13:
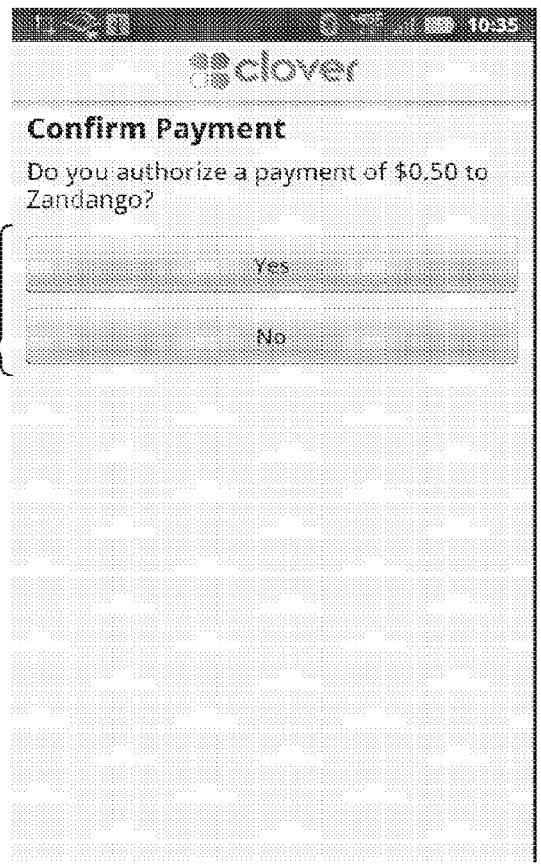
FIG. 13 is a screenshot illustrating one embodiment of an interface for the mobile payment application in which a user may authorize payment to be performed via the third-party application.
Figure 14:
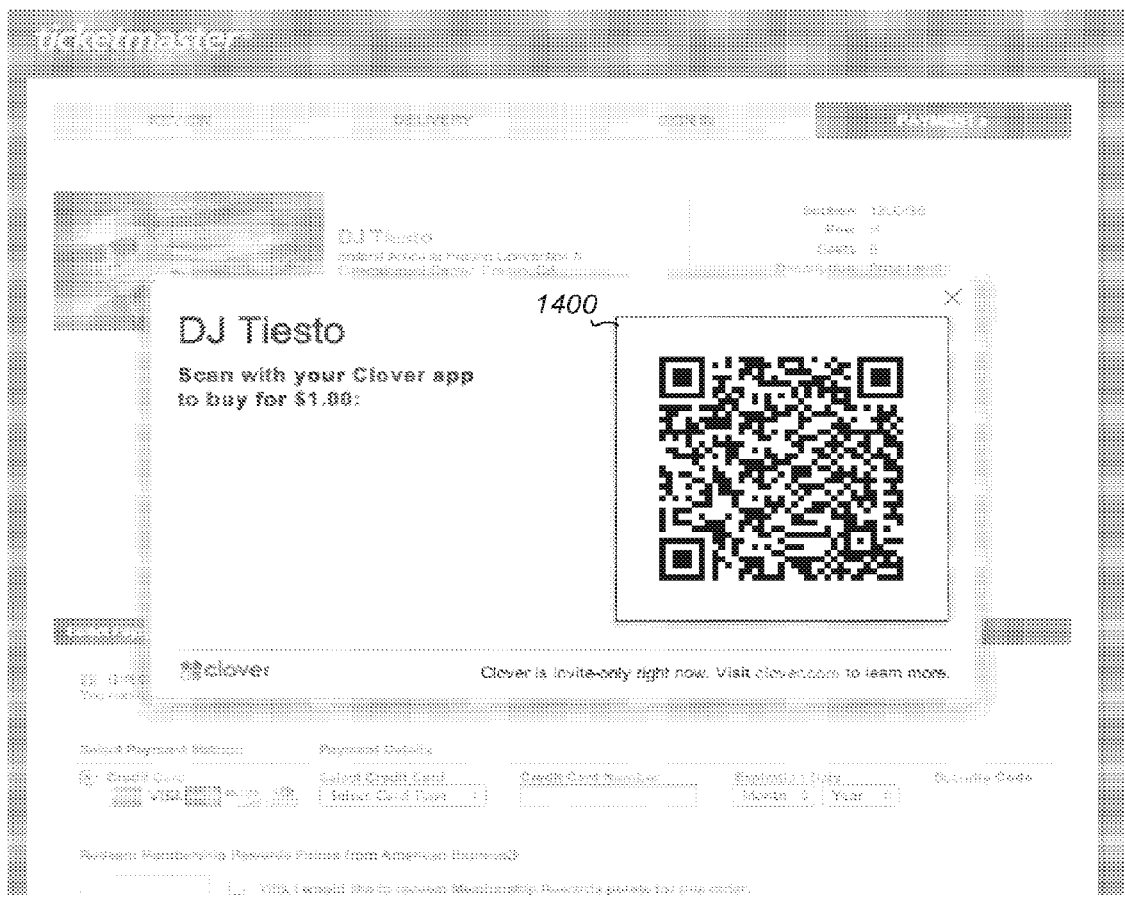
FIG. 14 is a screenshot illustrating one embodiment of a webpage that presents a barcode usable to initiate payment via the mobile payment application.
Figure 15:
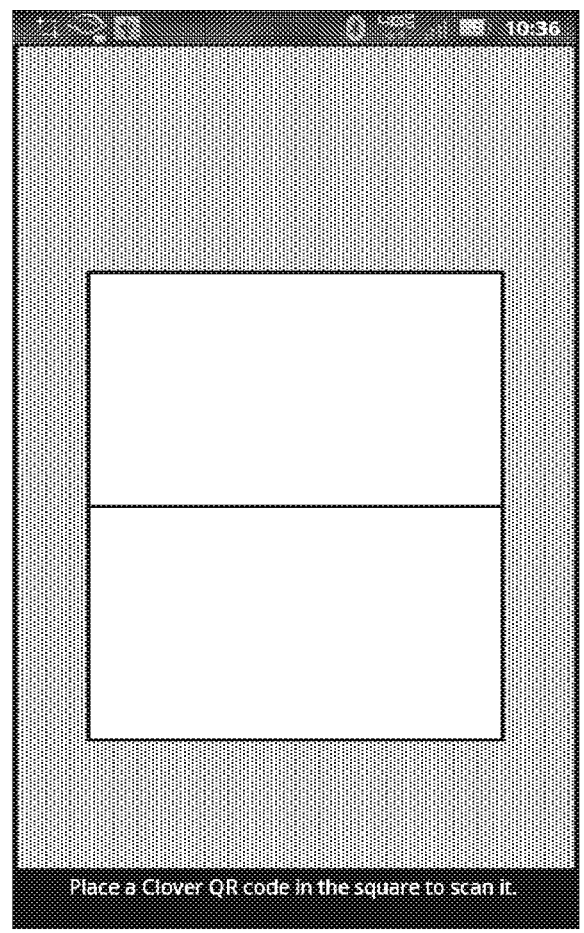
FIG. 15 is a screenshot illustrating one embodiment of an interface that defines a region in which a barcode should be placed in order to be scanned by the mobile payment application.
Figure 16:
FIG. 16 is a screenshot illustrating one embodiment of a webpage that integrates support for the mobile payment application.

Interfacing with Other Mobile Applications (FIGS. 12 and 13)

Third-party developers can integrate Clover using a small piece of code that directs their customer to switch quickly to the Clover application to make a payment. This works for mobile HTML as well as native applications like iPhone and Android. If the customer doesn't have the application, he or she is directed to the store to download it and once the account is created complete the flow. The customer is returned to the app with confirmation and any details, like shipping info, immediately after approving the purchase.

In some embodiments, third-party developers may integrate support for the mobile payment application into their applications. For example, FIG. 12 depicts a third-party application 1200 in which a user may purchase tickets and pay for the tickets using the mobile payment application. Third-party developers may support the mobile application by inserting code that directs their customer to switch quickly to the mobile payment application to make a payment. For example, in FIG. 12, an icon 1210 that is selectable to indicate a desire to use payment application 100 is inserted into third-party application 1200. This works for mobile HTML as well as native applications like those on iPhone and Android devices.

In various embodiments, payment application 100 is made active (i.e., invoked) on the mobile device in response to a user input within the third-party application running on the mobile device. For example, in one embodiment, selecting icon 1210 may cause application 1200 to submit a call to the underlining operating system on the mobile device. This call may result in the operating system performing a context switch causing payment application 100 to become active (i.e., be currently displayed to the user). After the payment application is active, the purchase may be confirmed within the payment application. For example, in FIG. 13, a user may confirm or reject the payment via confirmation options 1300.

In some embodiments, payment may be authorized without authenticating the user within the payment application. For example, as shown in FIGS. 12 and 13, application 100 does not present a user authentication interface after icon 1210 has been selected and application 100 is made active. Rather, application 100 proceeds directly to presenting confirmation options 1300. In doing so, the payment process is simplified for the user allowing the user to quickly purchase items.

In one embodiment, the user is returned to the third-party application after the payment has been confirmed and the payment request has been sent to the mobile payment service. Upon return, the user may be asked to provide additional payment details such as a delivery method, shipping info, etc.

In one embodiment, third-party support may be implemented such that the user is directed to a store to download the mobile application if the user does not have the payment application already installed on the mobile device. For example, a selection of icon 1210 within application 1200 may cause the user to be directed to a store usable to download payment application 100. After downloading and installing the application, the user may establish an account with the mobile payment service as discussed above. The user may then be permitted to proceed with payment as if the application were already installed to begin with.

Use of Barcodes (FIGS. 14-18)

Figure 17:
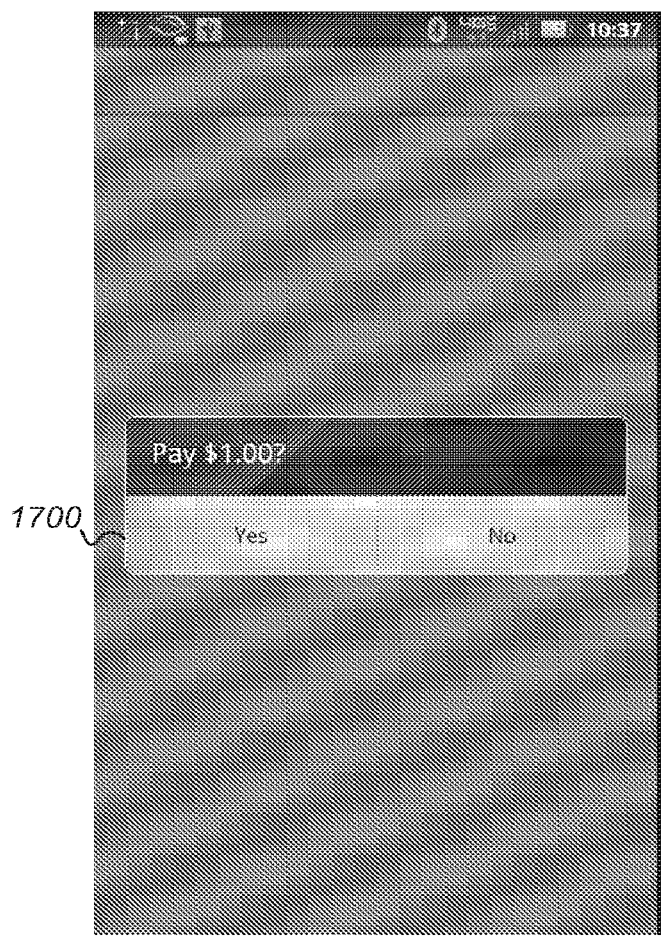
FIG. 17 is a screenshot illustrating one embodiment of an interface in which a user may confirm payment after scanning the barcode.
Figure 18:
FIG. 18 is a screenshot illustrating one embodiment of a webpage that displays a payment confirmation in response to a user confirming payment via the mobile payment application.

Once a barcode is generated, a user may include it in various electronic media, including a mobile web page, mobile application, web application, attachment an electronic communication (email message, text message, Tweet, etc.), and so on. Additionally, a barcode may be printed. However the barcode is delivered, the mobile device of the payee may be used to scan the barcode and then implement the instructions embedded in the barcode (e.g., by using a scanner and barcode reader, which may be functions of the mobile payment application in one embodiment). FIGS. 7-9 illustrate the use of a barcode within a mobile application, while FIGS. 14-18 illustrate the use of a barcode to purchase an item via a webpage by using a mobile device to scan a barcode 1400 (FIGS. 14 and 15) and then authorize purchase of the item e.g., via selections 1600 (FIG. 16) and 1700 (FIG. 17). A payment confirmation 1800 (FIG. 18) may be displayed upon completion of the purchase.

One type of barcode is an invite barcode, used to invite other users to the mobile payment service. Alternatively, a barcode may be a payment barcode, which is usable by the recipient to receive a payment. A request for payment barcode is used by a payor to pay a payee. For example, at a garage sale, different request for payment barcodes could be positioned next to items for sale. A user not wishing to carry or utilize cash for a transaction could use a mobile payment application running on his or her mobile device to scan the request for payment barcode to effectuate a transfer to the seller. One of many other possible examples is the use of a barcode on a tip jar at a coffee shop.

Still further, after making a purchase on a mobile device, a user may be sent a barcode. Scanning the barcode could act to authenticate the purchase, and in some embodiments, dynamically update the order status of an item on a web page.

Figure 19:
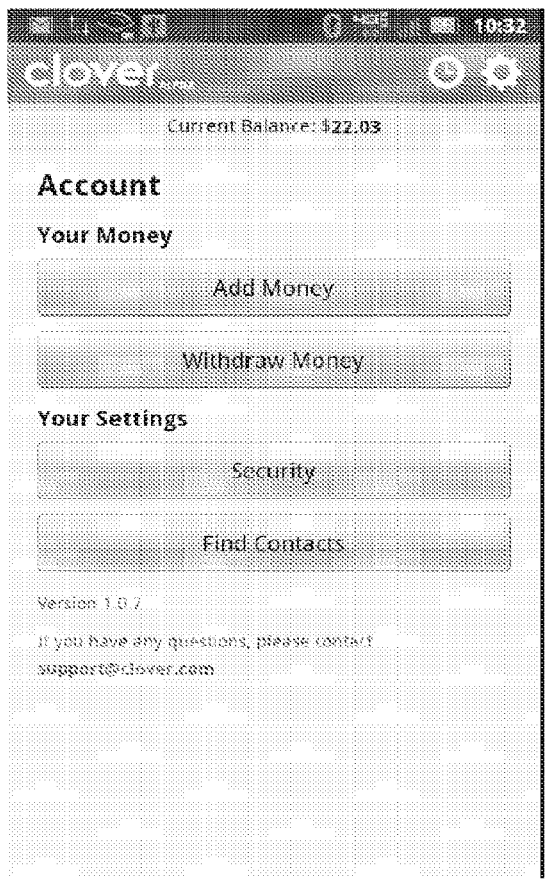
FIG. 19 is a screenshot illustrating one embodiment of an interface in which a user account balance or user settings may be adjusted.
Figure 20:
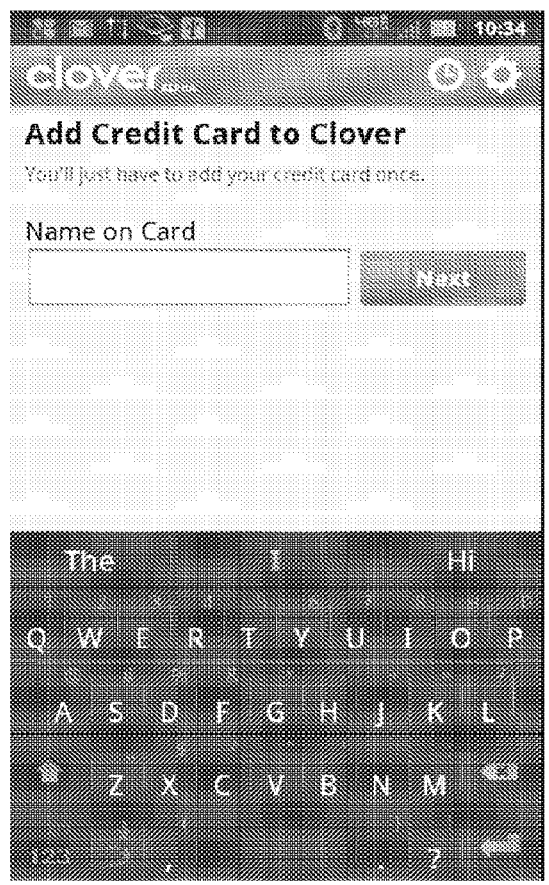
FIG. 20 is a screenshot illustrating one embodiment of an interface in which a user may enter credit card information to facilitate making payments via the mobile payment application.
Figure 21:
FIG. 21 is a screenshot illustrating one embodiment of an interface in which a user may select an account to which money may be withdrawn.

Configuring Account via Mobile Device (FIGS. 19-21)

Once an account is established, various forms of payments can be associated with the account (credit, debit, PAYPAL, ACH, etc.). Money may be added to (or withdrawn from) the account using any of the sources. FIGS. 19-21 illustrate that such information may be entered using the mobile device.

Account Access via Web Using Mobile Device

One of the drawbacks of a mobile device is that data entry is typically more cumbersome than with other computing devices (e.g., those having a standard size keyboard and pointing device). Thus, in some embodiments, a user may visit a website associated with the mobile payment service in order to add certain information to the account (e.g., credit card information, which may be entered once or infrequently). Because in some instances there is no username/password associated with a user's account, the user may instead use his or her mobile device to scan a barcode displayed on the website. The mobile device can then execute the instructions embedded in the barcode, which can in turn authorize the website to accept account updates from that particular computer on which the website is displayed, possibly for a limited amount of time.

Account Recovery Techniques for Mobile Application

In one embodiment, a secondary phone number may be used as a means of securing a new PIN or to reset the account if the customer loses the mobile device or the PIN. In various embodiments, the mobile payment system might call or text reset instructions to the backup phone number. In other instances, the mobile payment system might accept a phone call only from the specified backup number.

In other cases, voice recognition might be used for security purposes. During account establishment, the customer's voice may be recorded while speaking a requested security phrase. During a reset request, the customer would be prompted to repeat the phrase and the two voice samples would be compared to determine the customer's authenticity.

Use of Security Images in Mobile Applications

As a security measure, multiple photos may be presented to a customer, allowing the customer to select one as a security question. For instance, one set of photos may allow a customer to select his or her favorite brand of car. The customer would then be presented with a selection of photos as a challenge question in the future. This enables the customer to answer a question on a mobile device without having to type on the keypad.

Similarly, a customer's personal photos or social network photos may be another way of allowing the customer to know that a payment transaction is legitimately associated with the mobile payment service. Customers would be presented with an image they selected from their album whenever the mobile payment service asks them to make a payment or verify their PIN. If the image is not present, they should not proceed.

Methods and Systems (FIGS. 22-25)

FIG. 22 depicts a method 2200 for making payments via a mobile payment application. In one embodiment, method 2200 is performed by a computer system associated with a mobile payment service. Accordingly, such a computer system may interact with a mobile device executing a mobile payment application such as described above. In the illustrated embodiment, method 2200 includes, at step 2210, establishing an account that is linked to a mobile telephone number of a mobile device. In one embodiment, the account permits a user to make and receive payments; however, the account is not accessible without using the mobile device. In some embodiments, step 2210 may include determining that a previous account already exists for the mobile telephone number and overwriting the previous account to establish the account such that the mobile telephone number is associated with only a single account (as discussed above with respect to FIG. 2). In some embodiments, step 2210 may include establishing a personal identification number (PIN) for the user such that the mobile device requires user entry of the PIN for payment transactions that satisfy a set of user-specified criteria (as discussed above with respect to FIG. 3). In some embodiments, step 2210 may include inviting contacts of the user to establish accounts with the mobile payment system (as discussed above with respect to FIG. 4).

FIG. 23 depicts another method 2300 for making payments via a mobile payment application. In one embodiment, method 2300 is performed by a computer system associated with a mobile payment service such as described above. In the illustrated embodiment, method 2300 includes, at step 2310, receiving a request to make or receive a payment via a mobile payment account associated with a mobile device having a mobile telephone number. In some embodiments, the request may identify a payer, a payee, and/or a payment amount as specified by a user of the mobile application. Method 2300 further includes, at step 2320, processing the request via the account. In one embodiment, step 2320 includes generating a barcode (e.g., barcode 800) that includes embedded instructions for making a payment to a payee.

FIG. 24 depicts yet another method 2400 for making payments via a mobile payment application. In one embodiment, method 2400 is performed by a mobile device executing a mobile payment application such as application 100 described above. In the illustrated embodiment, method 2400 includes, at step 2410, sending a request from a payment application of a mobile device to a computer system. In such an embodiment, the request is to make or receive a payment via an account of a user that is associated with the payment application. In some embodiments, method 2400 further includes making the payment application active on the mobile device in response to a user input within a different application running on the mobile device. In one embodiment, the user input indicates selection of the payment application for facilitating payment for the purchase. In some embodiments, method 2400 further includes, after the payment application is active, confirming a purchase within the payment application such that the sending of the request is performed responsive to the confirming and without authenticating the user within the payment application (such as discussed above with respect to FIGS. 12 and 13). In some embodiments, method 2400 further includes, in response to sending the request, returning the user from the payment application to the different application. In one embodiment, the different application displays confirmation details indicative of the payment.

Figure 25:
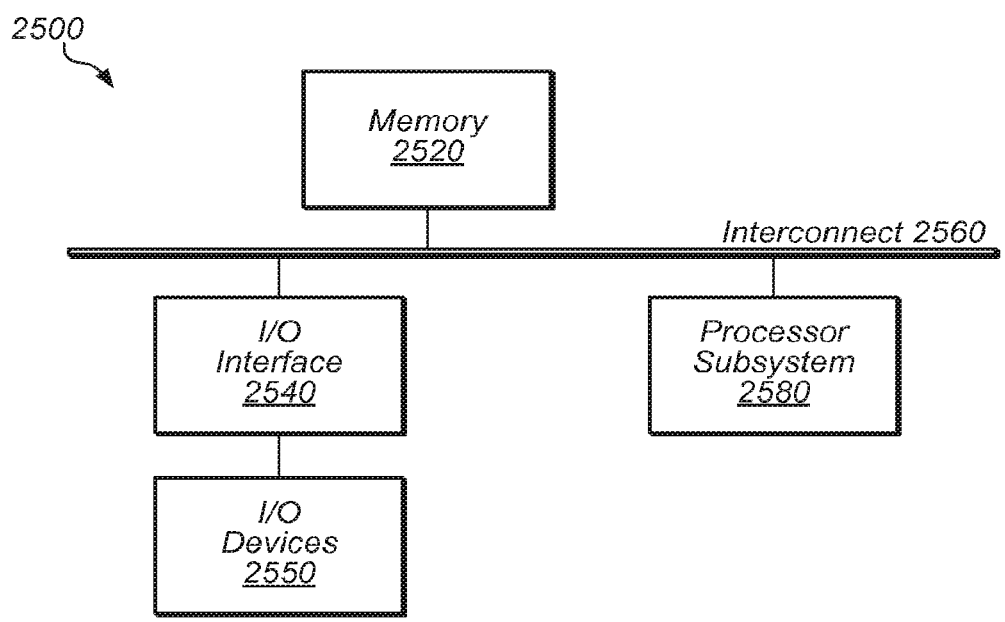
FIG. 25 is a block diagram illustrating one embodiment of a computer system that may implement functionality described herein.

FIG. 25 depicts a block diagram of an exemplary computer system 2500 that may implement functionality described herein. Accordingly, in one embodiment, computer system 2500 is a computer system that interfaces with a mobile device that executes the mobile payment application. In another embodiment, computer system 2500 is a mobile device that executes the mobile payment application. In still another embodiment, computer system 2500 is a computer system that presents a website that offers support for making payments via the mobile payment application.

In the illustrated embodiment, computer system 2500 includes a processor subsystem 2580 that is coupled to a system memory 2520 and I/O interfaces(s) 2540 via an interconnect 2560 (e.g., a system bus). I/O interface(s) 2540 is coupled to one or more I/O devices 2550. Computer system 2500 may be any of various types of devices, including, but not limited to, a server system, personal computer system, desktop computer, laptop or notebook computer, mainframe computer system, handheld computer, workstation, network computer, a consumer device such as a mobile phone, pager, or personal data assistant (PDA). Although a single computer system 2500 is shown in FIG. 25 for convenience, system 2500 may also be implemented as two or more computer systems operating together.

Processor subsystem 2580 may include one or more processors or processing units. In various embodiments of computer system 2500, multiple instances of processor subsystem 2580 may be coupled to interconnect 2560. In various embodiments, processor subsystem 2580 (or each processor unit within 2580) may contain a cache or other form of on-board memory.

System memory 2520 is usable by processor subsystem 2580. System memory 2520 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 2500 is not limited to primary storage such as memory 2520. Rather, computer system 2500 may also include other forms of storage such as cache memory in processor subsystem 2580 and secondary storage on I/O Devices 2550 (e.g., a hard drive, storage array, etc.). In some embodiments, these other forms of storage may also store program instructions executable by processor subsystem 2580. As used herein, a computer readable medium may refer to any form of medium that stores program instructions executable by one or more processors. The term computer readable medium is not used to connote only a transitory medium such as a carrier wave, but rather refers to non-transitory media such as those enumerated above.

I/O interfaces 2540 may be any of various types of interfaces configured to couple to and communicate with other devices, according to various embodiments. In one embodiment, I/O interface 2540 is a bridge chip (e.g., Southbridge) from a front-side to one or more back-side buses. I/O interfaces 2540 may be coupled to one or more I/O devices 2550 via one or more corresponding buses or other interfaces. Examples of I/O devices include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 2500 is coupled to a network via a network interface device.

The various methods as illustrated in the figures and described herein represent example embodiments only. The methods may be implemented in software, hardware, or a combination thereof. The order of these methods may be changed, and various elements may be added, reordered, combined, omitted, modified, etc. Various modifications and changes may be made by a person of ordinary skill in the art having the benefit of this specification. It is intended that the specification embrace all such modifications and changes and, accordingly, the above description to be regarded in an illustrative rather than a restrictive sense.

The invention claimed is:

1. A method, comprising:
   establishing, at a computer system, a mobile payment account associated with a mobile telephone number of a mobile device, wherein the mobile payment account is operable to make and receive payments, and wherein the mobile payment account is only accessible on the mobile device;
   initiating, at the computer system, a request to make or receive a payment via the mobile payment account; and
   receiving a generated barcode comprising embedded instructions for making a payment to a payee.

2. The method of claim 1, wherein the mobile payment account is established without setting up a username and password.

3. The method of claim 1, wherein the computer system does not use email to communicate regarding the mobile payment account.

4. The method of claim 1, further comprising receiving an indication that a previous mobile payment account already exists for the mobile telephone number and the previous mobile payment account is overwritten to establish the mobile payment account such that the mobile telephone number is associated with only a single mobile payment account.

5. The method of claim 1, wherein establishing the mobile payment account comprises establishing a personal identification number (PIN).

6. The method of claim 5, wherein a mobile payment application is executable on the mobile device to require entry of the PIN for payment transactions that satisfy a set of user-specified criteria.

7. The method of claim 1, wherein the mobile payment account is for a mobile payment system, wherein the method further comprises:
   responding to an invitation to establish a mobile payment account with the mobile payment system.

8. The method of claim 7, wherein the invitation is from a social networking service.

9. The method of claim 1, further comprising providing additional data with the mobile payment account, wherein the additional data is used to assess fraud risk.

10. The method of claim 9, wherein the additional data comprises GPS data.

11. The method of claim 9, wherein the additional data indicates contacts of a user.

12. The method of claim 1, wherein the barcode is scannable by a mobile device of the payee to determine the instructions embedded in the barcode, wherein the mobile device of the payee is configured to implement the embedded instructions in order to receive the payment.

* * * * *